United States Patent [19]

Stokes, Jr.

[11] Patent Number: 5,052,632
[45] Date of Patent: Oct. 1, 1991

[54] ZERO CROSSOVER WOUND FIBER OPTIC BOBBIN AND METHOD FOR FILLING SAME

[75] Inventor: Leland L. Stokes, Jr., Harvest, Ala.

[73] Assignee: The Boeing Company, Seattle, Wash.

[21] Appl. No.: 189,186

[22] Filed: May 2, 1988

[51] Int. Cl.$^5$ .................. B65H 54/10; B65H 55/00; B65H 75/18

[52] U.S. Cl. ................................. 242/47; 242/118.3; 242/159; 242/176

[58] Field of Search .............. 242/47, 53, 18 R, 18 G, 242/1, 159, 174, 176, 177, 178, 118, 118.3, 118.31, 118.32

[56] References Cited

U.S. PATENT DOCUMENTS

| | | |
|---|---|---|
| 1,172,565 | 2/1916 | Ryden . |
| 3,033,731 | 5/1962 | Cole . |
| 3,104,191 | 9/1963 | Hicks et al. . |
| 3,114,456 | 12/1963 | Van Billiard . |
| 3,215,029 | 11/1965 | Woodcock . |
| 3,319,781 | 5/1967 | Simpson et al. . |
| 3,514,351 | 5/1970 | Mukai . |
| 3,586,563 | 6/1971 | Fukami et al. .......................... 242/47 |
| 4,484,712 | 11/1984 | Leenders . |
| 4,630,652 | 12/1986 | Dieterich ............................. 242/47 |
| 4,746,080 | 5/1988 | Pinson . |

FOREIGN PATENT DOCUMENTS

| | | |
|---|---|---|
| 2616530 | 12/1988 | France . |
| 128167 | 7/1984 | Japan ................................... 242/47 |

Primary Examiner—Stanley N. Gilreath
Attorney, Agent, or Firm—Finnegan, Henderson, Farabow, Garrett & Dunner

[57] ABSTRACT

A bobbin for holding multiple layers of a continuous strand of optical fiber includes turning posts adjacent each axial end for looping the fiber strand following completion of one layer and reversing the winding direction to wind the next layer at the same pitch but with zero crossover. The posts are detachable following completion of winding to allow free streaming deployment of the fiber strand from the wound bobbin.

13 Claims, 2 Drawing Sheets

ZERO CROSSOVER WOUND FIBER OPTIC BOBBIN AND METHOD FOR FILLING SAME

BACKGROUND OF THE INVENTION

1. Field of the Invention

The invention relates to a method of winding optical fiber on a bobbin and, more particularly, to a method of winding optical fiber on a bobbin which permits free streaming of the fiber from the bobbin without clumping or knotting and which minimizes the effect on the optical signal passing through the fiber.

2. Description of Related Art

A number of weapons and communications systems have been developed or are under development which use an optical fiber for two-way data communication between two or more moving bodies or between a moving body and a fixed station. Examples of such uses include communication links between aircraft, between an aircraft and a ship, and between a projectile, such as a missile or mortar shell, and a control station at its launch site. Use of optical fiber for such communication precludes electromagnetic interference and compromising interception.

Optical fiber, however, has certain disadvantages not present in other forms of communication. Optical fiber is fragile rendering it subject to breakage while a wire communication system is stronger. Aside from breakage, optical fiber communication performance may be degraded by microcracks or microbends in the fiber generated by bending or other stresses imposed on the fiber. Such damage to an optical fiber not only reduces the fiber's long-term durability, but also causes losses in optical signal strength and content.

A typical optical fiber application involves packaging a continuous length of optical fiber on a bobbin inside a vehicle with one end of the fiber being attached to operational devices in the vehicle and attaching the other end of the fiber to a control or communication station at the launch site. After launching the vehicle, the optical fiber streams from the bobbin inside the vehicle allowing two-way communication with the vehicle during its flight.

The problem is to provide a reliable and compact means for packaging the optical fiber on the bobbin in a manner which minimizes stresses on the fiber, to preclude adverse effects on communication performance, and which permits reliable streaming deployment of the fiber during flight of the vehicle.

Conventional methods of winding optical fiber onto a bobbin involve translating and rotating the bobbin while applying the fiber. At the end of a fiber layer the translation direction is reversed while the winding direction is held the same, and the next layer applied. This results in the pitch between layers being reversed. On each turn the fiber crosses two turns in the layer below it as shown schematically in FIG. 1 which shows a conventional bobbin 5 with adjacent fiber layers 6,7. The upper layer 7 crosses over lower layer 6 at locations 8 on each side of the bobbin, only one side being visible in FIG. 1.

When optical fiber is wound by this method, small radius bends called microbends are induced at each crossover. The compressive stress in the glass optical waveguide at the microbends is a major contributor to optical attenuation in a wound bobbin. Successive layers of fiber increase the compressive stress in each microbend and increase optical attenuation proportionally. The length of fiber, and the range of the missile, are limited by the optical attenuation in the fiber between the optical transmitter and receiver, thus limiting the range between stations.

The point at which the layer being wound crosses over the layer below it is a function of winding tension, winding angle and surface friction of the fiber. The winding tension can be controlled within close tolerances, but the other two factors are not easily controlled. In order to sense the winding angle, complex and costly electronics are required. The winding process must be adjusted to account for changes in winding angle. The change in winding angle is, in effect, a change in the winding pitch, so that as the pitch changes the spacing between adjacent fibers is not uniform. This non-uniform spacing is cumulative and after several layers are wound, gaps tend to develop in the wind. These gaps cause the fiber turns in a layer to intermingle with the turns in the layer below and result in poor reliability when the fiber is stripped off the bobbin during transport between stations. This intermingling of fiber turns is called "slump".

In order for crossover to occur uniformly, the winding angle must change and the surface friction of the fiber must be overcome. Since the surface friction is a result of the manufacturing process, the friction coefficient changes with each manufactured batch of fiber. It is difficult to detect this change during the winding process. All these factors combine to make the winding process complex. This complexity leads to making the process labor intensive and reduces reliability. The major contributor to this complexity is the necessity to crossover the layer below.

Attempts have been made to provide a bobbin wound with multiple layers of optical fiber without having crossover fibers. In the method disclosed in U.S. Pat. No. 3,586,563 to Fukami et al., the winding direction is reversed following the completion of each separate layer causing the fiber to fold back on itself and form a loop adjacent the edge of the layer. While this method serves to reduce optical attenuation caused by crossover fibers, the freestanding loops cause "snagging" when the fiber is stripped from the bobbin at a high rate of speed during use. The free standing loops generally lie in plane perpendicular to the bobbin's surface and extend radially a height greater than the layer thickness as a consequence of the necessity for a non-zero loop radius. The loops thus create asperities in the wound fiber surface which can catch or "snag" the fiber from an overlying layer as it is stripped off.

SUMMARY OF THE INVENTION

The subject invention provides a method and apparatus for winding a continuous length of optical fiber on a bobbin in multiple layers, without crossover, and without free standing loops, for use in a moving or launched vehicle. The winding method minimizes stresses imposed on the fiber while permitting free streaming of the fiber from the vehicle without snagging. Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

In accordance with the purposes of the invention, as embodied and broadly described herein, the method of producing a bobbin filled with a continuous strand of compactly wound optical fiber arrayed in multiple layers, the filled bobbin being free from crossover fibers between the individual layers, comprises the steps of preparing and mounting on a winding machine, a bobbin having a first axial end, a second axial end, and a pair of turning posts, one located adjacent each axial end, and winding a first layer of the optical fiber in a first direction around the bobbin beginning at the first axial end, continuing in a first axial filling direction, and ending at the second axial end. The first direction-winding step includes the step of axially abutting adjacent turns of the optical fiber. Thereafter, there are accomplished the steps of looping the optical fiber around the turning post adjacent the second axial end, winding a second layer of the optical fiber in a second, reversed winding direction around the bobbin in a second, reversed axial filling direction from the second axial end to the first axial end, with the second direction-winding step including the step of axially abutting adjacent turns of the optical fiber, and looping the optical fiber around the turning post adjacent the first axial end. The above winding, looping, reverse-winding, and looping steps are repeated in sequence until the bobbin is filled to a desired level, and the compactly filled bobbin is then removed from the winding machine.

The preferred embodiment of the method also includes the steps of removing the turning posts from the filled bobbin to free the loop ends, and applying adhesive to the freed loop ends.

Further in accordance with the present invention, as embodied and broadly described herein, the bobbin for holding multiple layers of a continuous strand of optical fiber comprises a cylindrical member having opposed axial ends, and a pair of fiber-turning posts detachably secured to the cylindrical member, one adjacent each of the axial ends.

Still further in accordance with the present invention, as embodied and broadly described herein, the bobbin filled with a continuous strand of optical fiber comprises a cylindrical bobbin member having a peripheral surface and opposed axial ends; a plurality of layers of optical fiber wound on the bobbin member and located between the opposed ends, the layers being comprised of a continuous strand of optical fiber with adjacent fiber strand turns of each layer being in axial abutting relation, and the layers being free from crossover fibers; and first and second pluralities of fiber strand loops proximate the respective axial ends, each of the loops lying substantially flat to the shape of the bobbin member peripheral surface.

The invention resides in the novel parts, constructions, steps, arrangements, combinations and improvements shown and described. The accompanying drawing, which is incorporated in and constitutes a part of this specification, illustrates the presently preferred embodiment of the invention, and, together with the description, serves to explain the principles of the invention.

Reference will now be made to the present preferred embodiment of the invention which is illustrated in the accompanying drawing.

DESCRIPTION OF THE PREFERRED EMBODIMENT

Figure 1:
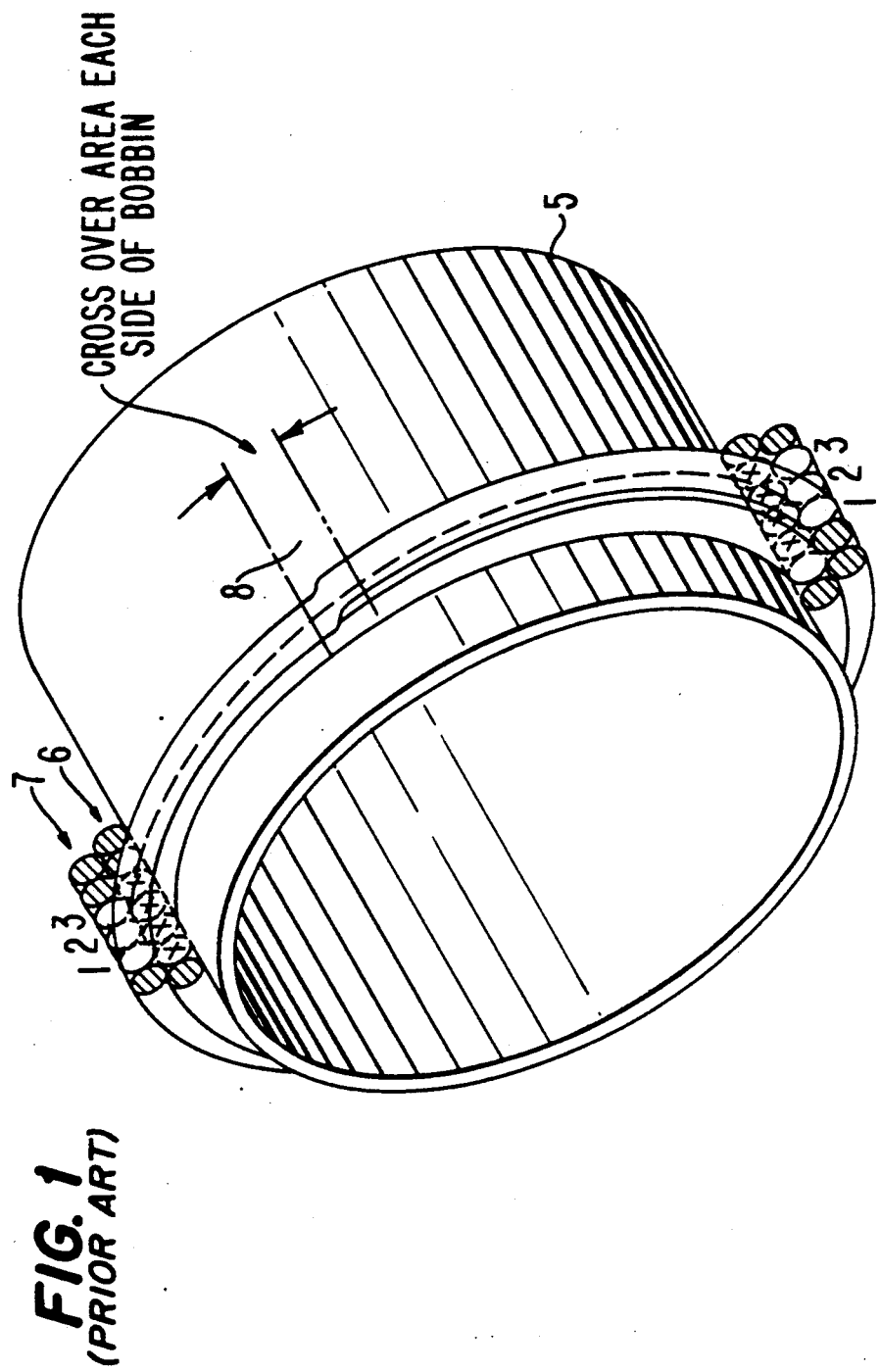
FIG. 1 is a perspective view of a conventional bobbin wound with optical fiber using a conventional method.
Figure 2:
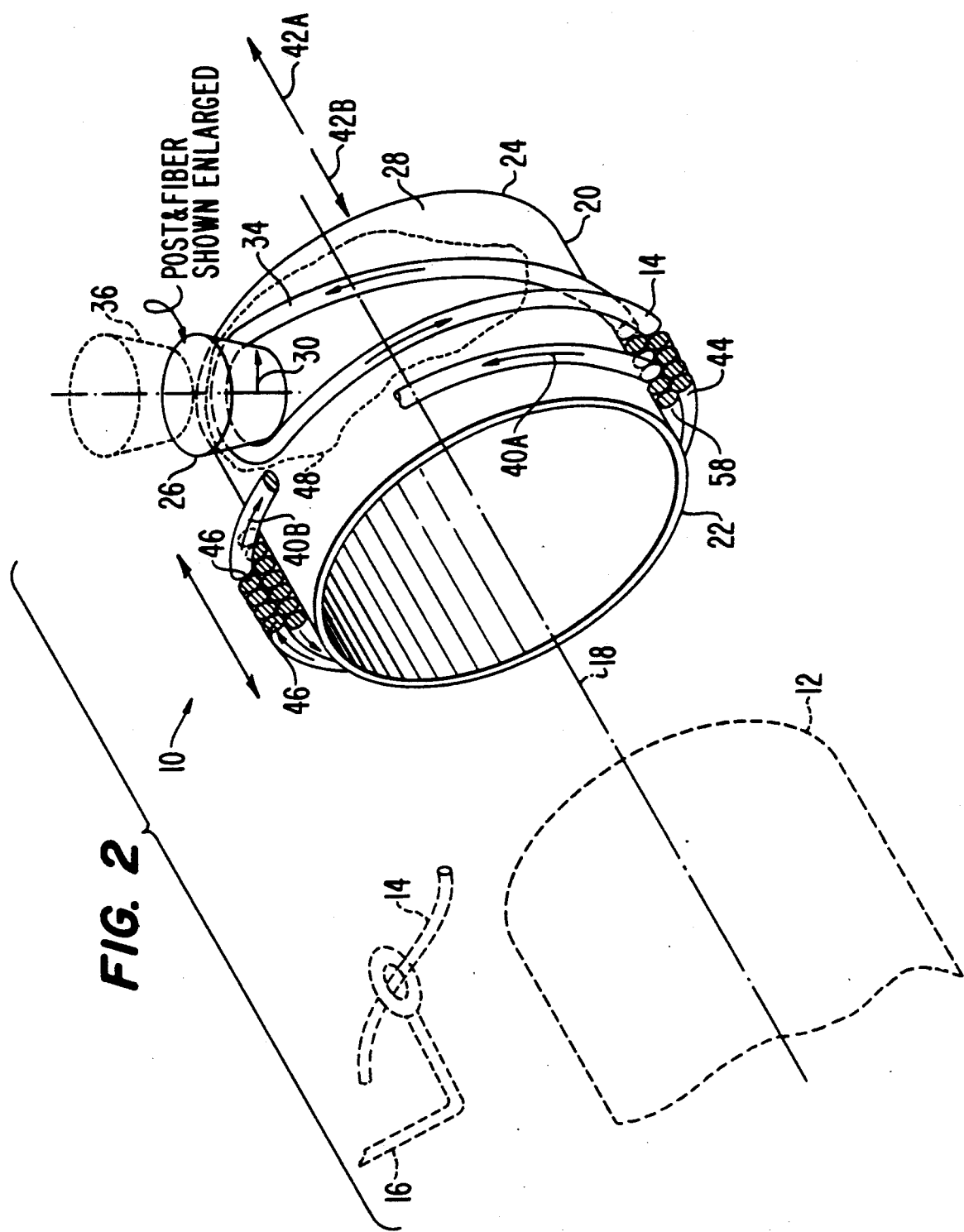
FIG. 2 is a perspective view of a bobbin constructed in accordance with the present invention, and wound with optical fiber in accordance with the method of the present invention.

Referring to FIG. 2, there is shown generally a bobbin 10 made in accordance with the present invention. Bobbin 10 is intended to be detachably mounted on mandrel 12 of a winding machine (shown in broken lines) to be filled with the continuous strand of optical fiber 14 from a fiber source (not shown). Fiber strand 14 is shown being carried by winding machine arm 16.

In accordance with the present invention, the bobbin for holding multiple layers of a continuous strand of optical fiber includes a cylindrical member having opposed axial ends, and a pair of fiber-turning posts detachably secured to the cylindrical member, one post adjacent each of the axial ends. As embodied herein, and as depicted in FIG. 2, bobbin 10 includes hollow cylindrical member 20 having opposed axial ends 22, 24. Bobbin 10 can be configured to mate with mandrel 12 in any number of ways such as by splines or keys (both not shown). Bobbin 10 also includes a pair of posts 26 (only one being shown for the purposes of clarity), one post adjacent each of the axial ends 22, 24. Post 26 provides a fulcrum for turning the optical fiber strand to reverse the winding direction in the bobbin filling method to be taught hereinafter.

Preferably, turning post 26 is substantially perpendicular to the peripheral surface 28 of bobbin cylindrical member 10. Post 26 also should have a minimum radius 30 large enough to prevent unacceptable crimping of the optical fiber 14 and resultant signal degradation during use. Post 26 can also be tapered, as is shown in FIG. 2, providing an increasing radius with increasing distance from the peripheral surface 28, to help maintain position of the resulting loops of optical fibers, such as loop 34 shown in FIG. 2.

It is also preferred that the post 26 be detachable from cylindrical member 20 after bobbin 10 has been filled. The contemplated use for filled bobbin 10 includes applications requiring free streaming of the fiber, as discussed previously, and permanent posts would impede or preclude altogether such use. As embodied herein, post 26 has a threaded portion 36 for mating with a threaded hole (not shown) in cylindrical member 20. Other detachable post constructions would be obvious to one skilled in the art given this disclosure, including "break away" posts. Although such "break away" post constructions would offer cost advantages, such constructions would have to be configured not to leave jagged edges or other asperities that would impede free streaming deployment of the fiber strand. Also, such break away constructions would render the posts non-reuseable and therefore may not be as advantageous as posts that can be attached/detached selectively.

The method of the present invention will now be described in relation to the embodiment shown in FIG. 2. In accordance with the present invention, the method of producing a bobbin filled with a continuous strand of compactly wound optical fiber arrayed in multiple layers, the filled bobbin being free from cross-over fibers between the individual layers includes the steps of preparing and mounting on a winding machine a bobbin having a first axial end, a second axial end and a pair f turning posts, one located adjacent each axial end, and also the step of winding a first layer of the optical fiber in a first direction around the bobbin beginning at the first axial end, continuing in a first axial filling direction, and ending at the second axial end. Moreover, the first direction-winding step includes the step of axially abutting adjacent turns of the optical fiber.

As embodied herein, bobbin 10 with post 26 is slid over and engaged with mandrel 12 and loose end 14a of the optical fiber strand is secured to cylindrical member 20, such as by looping around the post (not shown) adjacent axial end 22. Thereafter a first layer 38 of optical fiber is wound in a counter-clockwise direction (arrow 40A) about bobbin cylindrical member 20. As shown in FIG. 2, the individual turns of optical fiber comprising layer 38 are abutting in the filling direction 42A to preclude the existence of gaps between turns and maximize the winding density on bobbin 10. It is contemplated that the winding machine is of a type wherein mandrel 12 is rotatable about axis 18 and also translatable along axis 18, while winding machine arm 16 remains fixed. However, winding machine arm 16 can rotate and mandrel 20 translate, or vice versa, or winding machine arm 16 can rotate and translate with mandrel 12 remaining stationary, as one skilled in the art would appreciate.

Further, in accordance with the present invention, the zero crossover method includes the steps of looping the optical fiber strand around the turning post adjacent the second axial end, and winding a second layer of the optical fiber in a second winding direction around the bobbin in a second axial filling direction from the second axial end to the first axial end. The second winding direction is opposite the first winding direction, and the second direction-winding step includes the step of axially abutting adjacent turns of the optical fiber in the formed second layer.

As embodied herein, fiber 14 is turned round post 26 which is positioned adjacent axial end 24, to form loop 34 and both the direction of rotation and the direction of translation of mandrel 12 are reversed to wind a second layer 44 of the optical fiber 14. Importantly, the use of turning post 26 serves to orient each of loops 34 to lie essentially flat to the shape of peripheral surface 28. Since the thickness of the resulting loop in the radial direction is essentially the thickness of the fiber strand 14, no asperities are created such as would cause "snagging" during free streaming applications Also, it is clear from FIG. 2 that the individual turns of layer 44 wound in clockwise direction 40B can preferably rest in the gaps 46 formed by adjacent abutting turns in the first layer 38. The individual turns in second layer 44 also are axially abutted in direction 42B to achieve maximum fiber density and to provide a zero crossover condition.

Still further in accordance with the present invention, the method includes the additional steps of looping the optical fiber around the turning post adjacent the first axial end and then repeating the winding, looping and reverse winding steps in sequence until the bobbin is filled to a desired level, followed by the step of removing the compactly filled bobbin from the winding machine. As discussed previously, it is preferred that post 26 be removed following completion of the winding operation, such as by unscrewing the embodiment of post 26 shown in the drawing. Also, to the extent that reuseable posts are employed, the initial step of preparing bobbin 10 would include the step of mounting the detachable post 26.

Moreover, it is presently preferred that adhesive material 48 such as Norland Optical Adhesive (tradename) be applied to the freed loops 34 to help maintain their "flat" orientation and position until deployment. Alternatively, the entire filled bobbin 10 including loops 34 can be coated with the adhesive, and this adhesive coating step can be accomplished either before or after removal of the bobbin from mandrel 12.

The disclosed method, called "zero crossover winding" eliminates the requirement for crossovers, thereby reducing both the complexity of the winding process and the signal attenuation resulting from crossovers. As discussed above, winding by this method entails preferably rotating and translating bobbin 10 at a constant rate, determined by the desired winding pitch. Turning posts such as post 26 are provided at each end of bobbin 10. When a layer is completed, the fiber is looped around the post 26 adjacent the end of the bobbin where winding is completed and the bobbin rotation and translation are reversed. This results in the next layer being applied at the same pitch as the layer below it. The crossovers are eliminated and the fiber application angle remains constant.

As a consequence to the above, this winding method circumvents the problems encountered in prior attempts to provide "zero crossover winding." Elimination of crossovers reduces optical attenuation and increases the permissible range between the receiving and transmitting stations. The winding method is not vulnerable to changes in the fiber friction, and the winding pitch is uniform due to the absence of crossovers. Finally, the winding can be accomplished more rapidly and with greater repeatability due to the constant winding angle.

It will be apparent to those skilled in the art that various modifications and variations can be made to the bobbin and "zero crossover winding" method of the present invention without departing from the scope or spirit of the invention, and such modifications and variations are deemed to come within the scope of the appended claims.

What is claimed is:

1. A method of producing a bobbin filled with a continuous strand of compactly wound optical fiber arrayed in multiple layers, the filled bobbin being free from crossover fibers between the individual layers, the method comprising the steps of:
   (a) preparing and mounting on a winding machine, a bobbin having a peripheral surface, a first axial end, a second axial end, and a pair of turning posts, one turning post located adjacent each axial end;
   (b) winding a first layer of the optical fiber in a first direction around the bobbin beginning at the first axial end, continuing in a first axial filling direction, and ending at the second axial end, said first direction-winding step including the step of axially abutting adjacent turns of the optical fiber;
   (c) looping the optical fiber around the turning post adjacent the second axial end to form a loop end;
   (d) winding a second layer of the optical fiber in a second, reversed winding direction around the bobbin in a second, reversed axial filling direction from the second axial end to the first axial end, said second direction-winding step including the step of axially abutting adjacent turns of the optical fiber;
   (e) looping the optical fiber around the turning post adjacent the first axial end to form another loop end, said loop end and said another loop end being oriented substantially flat to said peripheral surface;

(f) repeating steps (b) through (e) in sequence until the bobbin is filled to a desired level;

(g) removing the compactly filled bobbin from the winding machine; and removing the turning posts from the filled bobbin to free said loop ends, said freed loop ends remaining oriented substantially flat to the peripheral surface of said bobbin.

2. The method as in claim 1 wherein said winding steps (b) and (d) include the steps of rotating the bobbin in a direction counter to the respective winding directions.

3. The method as in claim 2 wherein said winding steps also include the steps of translating the bobbin in an axial direction opposite to the respective axial filling direction simultaneously with said respective rotating steps.

4. The method as in claim 1 including the still further step of applying temporary adhesive to retain orientation and position of the freed loop ends.

5. The method as in claim 1 wherein the turning posts are selectively attachable to, and detachable from, the bobbin, and wherein the preparing step includes the step of attaching the turning posts to the bobbin.

6. A bobbin for holding multiple layers of a continuous strand of optical fiber comprising:
a cylindrical member having opposed axial ends and a peripheral surface; and
a pair of fiber-turning posts detachably secured to said cylindrical member, one adjacent each of said axial ends.

7. The bobbin as in claim 6 wherein each of said pair of detachable posts is oriented substantially normal to the peripheral surface of said cylindrical member.

8. The bobbin as in claim 6, wherein said fiber-turning posts are threaded to said cylindrical member.

9. The bobbin as in claim 6, wherein said fiber-turning posts have a "break away" construction.

10. A bobbin filled with a continuous strand of optical fiber comprising:
a cylindrical bobbin member having a peripheral surface and opposed axial ends;
a plurality of layers of optical fiber wound on said bobbin member and located between said opposed ends, said layers being comprised of a continuous strand of optical fiber with adjacent fiber strand turns of each layer being in axial abutting relation, and said layers being free from crossover fibers; and
first and second pluralities of free fiber strand loops proximate the respective axial ends, each of said loops lying substantially flat to conform to said peripheral surface.

11. The filled bobbin as in claim 10 wherein said loops are held in place by an adhesive.

12. The filled bobbin as in claim 10 wherein said layers and said loops are held in place by an adhesive.

13. The filled bobbin as in claim 10 wherein the fiber strand turns in a given layer lie in respective grooves formed by the abutting fiber strand turns of radially adjacent layers.

* * * * *